Patented Jan. 9, 1951

2,537,712

UNITED STATES PATENT OFFICE 2,537,712

POLYMERIC VINYLIDENE CHLORIDE COMPOSITIONS HAVING LITTLE TENDENCY TO ACQUIRE AND RETAIN AN ELECTRIC CHARGE

Eugene D. Serdynsky, James S. Gowing, and Ralph M. Wiley, Midland, and Carl B. Havens, Hope, Mich., assignors to The Dow Chemical Company, Midland, Mich., a corporation of Delaware No Drawing. Application June 20, 1949, Serial No. 100,302

4 Claims. (Cl. 260—31.8)

This invention relates to polymeric vinylidene chloride compositions, and articles made therefrom, having a reduced tendency to accumulate and to retain static electric charges.

The polymer of vinylidene chloride and copolymers in which vinylidene chloride predominates, as well as their plasticized compositions (all being referred to herein as "polymeric vinylidene chloride compositions") have the tendency to accumulate and retain charges of static electricity. In the case of molded and extruded articles made from such compositions, this tendency is especially noticeable, and it becomes objectionable in articles such as films and woven fabrics having large areas. This undesirable property causes oppositely charged particles of dust and lint to collect on the polymeric vinylidene chloride articles in which a charge has accumulated. It also makes difficult the separation of one film or fabric sheet from another, as friction resulting from attempted separation of such sheets generates enough of a charge, of opposite polarity in the opposed surfaces, to cause those surfaces to adhere to one another. Even when handling powdered forms of polymeric vinylidene chloride compositions, it is observed that the powder may be highly charged and that it tends to interfere with such operations as the dry blending of other modifiers, or sifting to separate particles of specific dimensions.

It would be highly desirable, and it is the principal object of the present invention, to provide a means for reducing substantially the tendency of vinylidene chloride polymers and articles made from them to accumulate or to retain charges of static electricity. A related object is to provide such means whereby the said undesirable tendency is substantially permanently reduced. A particular object is to provide polymeric vinylidene chloride compositions substantially free from tendency to acquire or retain static electric charges. Other and related objects may appear hereinafter.

According to the present invention, the tendency of polymeric vinylidene chloride, and of articles made therefrom, to acquire and retain charges of static electricity is reduced to an unobjectionably low level by adding to the polymer composition and uniformly mixing therewith from 0.5 to 5 per cent by weight of a compound selected from the class consisting of mono-n-butyl, mono-n-amyl and mono-isoamyl esters of adipic acid. When molded, extruded and woven articles of large surface area per unit weight, including films, filaments and fabrics, are produced from a polymeric vinylidene chloride product containing from 0.5 to 5 per cent of one of the defined half esters of adipic acid, the product is noticeably and significantly less prone to acquire and retain static charges than are otherwise identical articles made from the same basic composition but without the half ester.

Two simple tests have been devised to measure the effectiveness of an anti-static agent. In one, a sample of the polymeric article is rubbed with a static generating surface, such as fur, wool or paper, for a fixed time interval. The sample is then inserted in a grounded electric measuring circuit. The time required for the charge in the sample to be fully discharged is noted. The more rapidly it loses its charge, the more effective is the anti-static agent in or on the sample. In another test, a sample of the polymeric article is fastened about the rim of a rotor which turns at a fixed rate in contact with another rotor turning in the opposite direction at the point of contact (i. e., in the same direction relative to the axis). A strip of paper is drawn continuously between the two rotors, counter to the direction of rotation of the test sample, and in frictional contact therewith. In each rotation of the sample, it rubs momentarily against the paper sheet, tending to build up a charge, and then it is brought into contact with a grounded copper brush, which tends to carry away the charge, through a millivolt meter. At a fixed rate of rotation, the time is noted which is required to build up the charge to some arbitrarily chosen value. The longer the time required, the more effective is the anti-static agent in or on the sample.

Using the second described test method, the time required to build up a predetermined charge of static electricity was noted in tests made on molded compositions containing from 2 to 4 per cent of the half ester and 96 to 98 per cent of a commercial plasticized copolymer of about 90 per cent vinylidene chloride and 10 per cent vinyl chloride. The values obtained were compared with those on otherwise identical control samples containing none of the mono-esterified adipic acid. Typical results are given below:

| Modifier | Time Required to Develop Standard Charge |
|---|---|
| | *Minutes* |
| None (control) | 1 to 2 |
| Mono-isoamyl adipate, 4 per cent | 30 |
| Mono-n-amyl adipate, 2 per cent | 60 |
| Mono-n-butyl adipate, 2 per cent | 60 |

When using the first test method, to determine the time required to lose completely the static charge acquired in a fixed period of time, the compositions containing from 0.5 to 5 per cent of one of the defined half esters were discharged in from 5 to 25 per cent of the time required by the control samples.

Each of the defined half esters contributes the desired property to the polymer compositions, giving effective and substantially permanent protection against static build-up and static retention to articles made from the modified compositions.

The invention is applicable to compositions and articles made from the homopolymer of vinylidene chloride or from any of the copolymers in which vinylidene chloride predominates, whether or not such articles or compositions contain contain conventional plasticizers, stabilizers and similar modifiers. The most common and commercially useful copolymers of vinylidene chloride are those which contain vinyl chloride, vinyl acetate, acrylonitrile, ethyl acrylate, methyl methacrylate, or styrene as a copolymerized constituent, but the invention is not limited to the treatment of these specific copolymers and articles made from them.

We claim:

1. A composition of matter having little tendency to acquire and retain a charge of static electricity, the essential ingredients of which are a polymer in which vinylidene chloride predominates and from 0.5 to 5 per cent of the weight of such polymer of a compound selected from the class consisting of mono-n-butyl adipate, mono-n-amyl adipate and mono-isoamyl adipate.

2. A composition of matter having little tendency to acquire and retain a charge of static electricity, the essential ingredients of which are a polymer in which vinylidene chloride predominates and from 0.5 to 5 per cent of mono-n-butyl adipate.

3. A composition of matter having little tendency to acquire and retain a charge of static electricity, the essential ingredients of which are a polymer in which vinylidene chloride predominates and from 0.5 to 5 per cent of mono-n-amyl adipate.

4. A composition of matter having little tendency to acquire and retain a charge of static electricity, the essential ingredients of which are a polymer in which vinylidene chloride predominates and from 0.5 to 5 per cent of mono-n-isoamyl adipate.

EUGENE D. SERDYNSKY.
JAMES S. GOWING.
RALPH M. WILEY.
CARL B. HAVENS.

No references cited.